(12) United States Patent
Feng

(10) Patent No.: US 11,894,686 B2
(45) Date of Patent: Feb. 6, 2024

(54) POWER CONTROL METHOD AND POWER SYSTEM

(71) Applicant: Huawei Technologies Co., Ltd., Shenzhen (CN)

(72) Inventor: Jinli Feng, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/056,786

(22) Filed: Nov. 18, 2022

(65) Prior Publication Data

US 2023/0082340 A1  Mar. 16, 2023

Related U.S. Application Data

(63) Continuation of application No. PCT/CN2021/093215, filed on May 12, 2021.

(30) Foreign Application Priority Data

May 20, 2020 (CN) .......................... 202010429941.2

(51) Int. Cl.
| | |
|---|---|
| *H02J 3/38* | (2006.01) |
| *H02J 1/10* | (2006.01) |
| *H02J 1/00* | (2006.01) |
| *H02J 3/00* | (2006.01) |
| *H02J 1/12* | (2006.01) |
| *H02J 3/02* | (2006.01) |

(52) U.S. Cl.
CPC .............. *H02J 3/381* (2013.01); *H02J 1/002* (2020.01); *H02J 1/12* (2013.01); *H02J 1/122* (2020.01); *H02J 3/0073* (2020.01); *H02J 3/02* (2013.01); *H02J 2300/24* (2020.01); *H02J 2300/40* (2020.01)

(58) Field of Classification Search
CPC .. H02J 3/0073; H02J 3/02; H02J 3/381; H02J 3/382; H02J 3/383; H02J 1/002; H02J 1/12; H02J 1/122; H02J 2300/24; H02J 2300/40
USPC ............................................... 307/23, 82, 18
See application file for complete search history.

(56) References Cited

U.S. PATENT DOCUMENTS

| | | | |
|---|---|---|---|
| 2006/0006850 A1 | 1/2006 | Inoue et al. | |
| 2013/0293012 A1 | 11/2013 | Song et al. | |
| 2017/0070049 A1* | 3/2017 | Laubenstein | ....... H02J 7/00047 |

FOREIGN PATENT DOCUMENTS

| | | |
|---|---|---|
| CN | 104124748 A | 10/2014 |
| CN | 104734140 A | 6/2015 |
| CN | 204669309 U | 9/2015 |
| CN | 106374452 A | 2/2017 |
| CN | 107154620 A | 9/2017 |
| CN | 109861303 A | 6/2019 |
| CN | 110289621 A | 9/2019 |

(Continued)

*Primary Examiner* — Hal Kaplan
(74) *Attorney, Agent, or Firm* — Slater Matsil, LLP

(57) ABSTRACT

A power control method comprises: obtaining voltage information of each input circuit; generating a first control signal based on the voltage information and a bus voltage value; converting a voltage of each input circuit into a bus voltage based on the first control signal; obtaining load information; generating a second control signal based on the load information and the bus voltage value; converting the bus voltage into a load voltage based on the second control signal; and outputting the load voltage.

20 Claims, 7 Drawing Sheets

(56) References Cited

FOREIGN PATENT DOCUMENTS

| EP | 3806265 A1 | 4/2021 |
|---|---|---|
| WO | 2019226081 A1 | 11/2019 |

* cited by examiner

POWER CONTROL METHOD AND POWER SYSTEM

CROSS-REFERENCE TO RELATED APPLICATIONS

This application is a continuation of International Application No. PCT/CN2021/093215, filed on May 12, 2021, which claims priority to Chinese Patent Application No. 202010429941.2, filed on May 20, 2020. The disclosures of the aforementioned applications are hereby incorporated by reference in their entireties.

TECHNICAL FIELD

This application relates to the wireless communication field, and in particular, to a power control method and a power system.

BACKGROUND

Communication devices in different networks and related devices are deployed at some stations, such as a building baseband unit (BBU), a remote radio unit (RRU), a base station controller (BSC), and a base station air conditioner. Station devices may be powered by a plurality of types of power supply systems, such as a solar power system, an alternating current mains power system, a high-voltage direct current power system, and a 48 V direct current power.

For a plurality of power requirements, different types of power supplies may be deployed at a station at the same time. Refer to FIG. 1. One station has a plurality of input power supplies, which are respectively a mains power 101, a solar power supply 104, a high-voltage direct current power 107, and a 48 V direct current power 110. The station is equipped with an alternating current-direct current power system 102, a first direct current device 103, a photovoltaic-direct current power system 105, a second direct current device 106, a high-voltage direct current-direct current power system 108, a third direct current device 109, a direct current-alternating current power system 111, and an alternating current device 112. A rated voltage of the first direct current device 103, the second direct current device 106, and the third direct current device 109 is 48 V, and a rated voltage of the alternating current device 112 is 220 V.

Each type of input power supply needs to be provided with one corresponding power system for conversion. For example, the mains power 101 outputs a 220 V alternating current, and the alternating current-direct current power system 102 converts the 220 V alternating current into a 48 V direct current, and then outputs the 48 V direct current to the first direct current device 103. The solar power supply 104 outputs a 0-100 V direct current, and the photovoltaic-direct current power system 105 converts the o-100 V direct current into a 48 V direct current, and then outputs the 48 V direct current to the second direct current device 106. The high-voltage direct current power 107 outputs a 400 V direct current, and the high-voltage direct current-direct current power system 102 converts the 400 V direct current into a 48 V direct current, and then outputs the 48 V direct current to the third direct current device 109. A 48 V direct current power 110 outputs a 48 V direct current, and the direct current-alternating current power system 11 converts the 48 V direct current into a 220 V alternating current, and then outputs the 220 V alternating current to the alternating current device 112.

In actual application, various types of power systems are incompatible with each other, and management and maintenance are complicated. In addition, costs for deploying a plurality of power systems are high.

SUMMARY

In view of this, this application provides a power control method and a power system, to support a plurality of types of power inputs and/or a plurality of types of power outputs, and manage the power inputs and outputs. In this way, power supply flexibility can be improved, and power management efficiency can be improved.

According to a first aspect, a power control method applied to a power system is provided. The method includes: obtaining voltage information of each input circuit; generating a first control signal based on the voltage information and a bus voltage value; converting a voltage of each input circuit into a bus voltage based on the first control signal; obtaining load information; generating a second control signal based on the load information and the bus voltage value; converting the bus voltage into a load voltage based on the second control signal; and outputting the load voltage.

The power system includes an input module, a power management unit, an output module, and a bus. The bus is separately electrically connected to the input module, the power management unit, and the output module. The input module includes a power detection circuit and a conversion unit. The output module includes a load detection circuit and a conversion unit. The input module and/or the output module include/includes a plurality of types of conversion units. The power management unit is separately connected to the input module and the output module through signal cables. The input circuit is a connection circuit between the input module and a central office power system. The bus voltage may be a 48 V direct current voltage or a 57 V direct current voltage, or may be another direct current voltage specified based on an actual situation.

For each connection circuit between the central office power system and the conversion unit and each connection circuit between a load and the conversion unit, a connectivity status and voltage information of each connection circuit may be monitored. In this way, one or more input voltages can be managed, and one or more output voltages can be provided for one or more loads. It can be understood that, a current and/or a power of each connection circuit may be further monitored and controlled.

In a possible implementation, the generating a first control signal based on the voltage information of each input circuit and a bus voltage value includes: when the voltage information includes a voltage type and a voltage value, when the voltage type is a direct current voltage and a direct current voltage value changes in a solar voltage range, generating a first control signal used to control a photovoltaic-direct current conversion unit. In this way, that the central office power system is a solar power supply can be automatically identified based on voltage fluctuation, and the first control signal used to control a photovoltaic-direct current conversion unit is generated. After the first control signal is output to the photovoltaic-direct current conversion unit, the photovoltaic-direct current conversion unit can convert, based on the first control signal, a voltage input by the solar power supply into the bus voltage. The solar voltage range may be but is not limited to 0-100 V.

In another possible implementation, when the voltage information includes a voltage type and a voltage value, the generating a first control signal based on the voltage information of each input circuit and a bus voltage value includes: when the voltage type is an alternating current voltage and an alternating current voltage value changes in a mains voltage range, generating a first control signal used to control a first alternating current-direct current conversion unit. The first alternating current-direct current conversion unit is configured to convert the mains into the bus voltage. The mains voltage range may be but is not limited to 90 V-290 V.

In this way, that the central office power system is a mains power can be automatically identified based on voltage fluctuation, and the first control signal used to control an alternating current-direct current conversion unit is generated. After the first control signal is output to the alternating current-direct current conversion unit, the first alternating current-direct current conversion unit can convert a mains voltage into the bus voltage based on the first control signal.

In another possible implementation, when the voltage information includes a voltage type and a voltage value, the generating a first control signal based on the voltage information of each input circuit and a bus voltage value includes: when the voltage type is an alternating current voltage and an alternating current voltage value changes in a generation voltage range of a diesel generator, generating a first control signal used to control a second alternating current-direct current conversion unit. The second alternating current-direct current conversion unit is configured to convert an alternating current voltage generated by a diesel generator power supply into the bus voltage. The generation voltage range of the diesel generator may be but is not limited to 176 V-240 V.

In another possible implementation, when the voltage information includes a voltage type, the generating a first control signal based on the voltage information of each input circuit and a bus voltage value includes: when the voltage type is a sine wave alternating current voltage, generating a first control signal used to control a first alternating current-direct current conversion unit; and when the voltage type is a square wave alternating current voltage, generating a first control signal used to control a second alternating current-direct current conversion unit.

When the voltage type is the sine wave alternating current voltage, it is determined that the central office power system is a mains power. When the voltage type is the square wave alternating current voltage, it is determined that the central office power system is a diesel generator power supply. For an input alternating current voltage, a power type of the input alternating current voltage can be identified without obtaining a voltage value thereof.

In another possible implementation, when the voltage information includes a voltage type and a voltage value, the generating a first control signal based on the voltage information of each input circuit and a bus voltage value includes: when the voltage information is a direct current voltage and a direct current voltage value changes in a high-voltage direct current voltage range, generating a first control signal used to control a first direct current conversion unit. The first direct current conversion unit is configured to convert a high-voltage direct current voltage into the bus voltage. The high-voltage direct current voltage range may be but is not limited to 80 V-400 V.

In this way, that the central office power system is a high-voltage direct current power can be automatically identified based on voltage fluctuation. In this case, the first control signal used to control a first direct current conversion unit is generated. After the first control signal is output to the first direct current conversion unit, the first direct current conversion unit can convert, based on the first control signal, a voltage input by the high-voltage direct current power into the bus voltage.

In another possible implementation, when the load information includes a load voltage type and a load voltage value, the generating a second control signal based on the load information and the bus voltage value includes: when the load type is a direct current load and the load voltage value is lower than a high-voltage direct current voltage value, generating a second control signal used to control a second direct current conversion unit, where the second direct current conversion unit is configured to convert the bus voltage into a load voltage corresponding to the load voltage value. The load voltage value may be but is not limited to 12 V, 24 V, 48 V, or 72 V.

In this way, the direct current load can be automatically identified. In this case, the second control signal used to control a second direct current conversion unit is generated. After the second control signal is output to the second direct current conversion unit, the second direct current conversion unit can decrease the bus voltage to the load voltage based on the second control signal.

In another possible implementation, the generating a second control signal based on the load information and the bus voltage value includes: when the load type is a high-voltage direct current load, generating a second control signal used to control a third direct current conversion unit. The third direct current conversion unit is configured to convert the bus voltage into a high-voltage direct current voltage.

In this way, the high-voltage direct current load can be automatically identified. In this case, the second control signal used to control a third direct current conversion unit is generated. After the second control signal is output to the third direct current conversion unit, the third direct current conversion unit can increase the bus voltage to the high-voltage direct current voltage based on the second control signal.

In another possible implementation, the generating a second control signal based on the load information and the bus voltage value includes: when the load type is an alternating current load, generating a second control signal used to control a direct current-alternating current conversion unit.

In this way, the alternating current load can be automatically identified, and the second control signal used to control a direct current-alternating current conversion unit is generated. After the second control signal is output to the direct current-alternating current conversion unit, the direct current-alternating current conversion unit can convert the bus voltage into an alternating current voltage based on the second control signal.

In another possible implementation, the method further includes: generating a third control signal when a load type is a direct current load and a load voltage value is equal to the bus voltage value; and outputting the bus voltage to a load through a branch circuit based on the third control signal. When the load type is the direct current load and the load voltage value is equal to the bus voltage value, it indicates that the bus voltage can be directly used as the load voltage. In this way, the bus voltage can be output to the load through the branch circuit of the output module.

In another possible implementation, before the obtaining voltage information of each input circuit, the method includes: obtaining load power consumption; and when the load power consumption is less than or equal to a first power, controlling the photovoltaic-direct current conversion unit to be connected to the solar power supply, and controlling the alternating current-direct current conversion unit to be connected to the mains power; or when the load power consumption is greater than the first power and less than a second power, controlling the photovoltaic-direct current conversion unit to be connected to the solar power supply, controlling the alternating current-direct current conversion unit to be connected to the mains power, and controlling the direct current conversion unit to be connected to the high-voltage direct current power. Each input circuit is connected to one central office power system. The central office power system includes the solar power supply, the mains power, and the high-voltage direct current power. The first power is equal to a sum of a power of the mains and a power of the solar power supply. The second power is equal to a sum of the power of the mains, the power of the solar power supply, and a power of the high-voltage direct current power. In this way, the central office power system can be flexibly selected based on the load power consumption, and various central office power systems can supply power together.

In another possible implementation, when a power failure of the mains power occurs, the method includes controlling a backup battery to be connected to the bus. The central office power system includes the mains power and the backup battery. It can be understood that, in a scenario in which the various central office power systems supply power together, when a power failure of any one or more central office power systems occurs, the backup battery can be controlled to be connected to the bus, to keep an input voltage and an output voltage stable.

In another possible implementation, when a power failure of the mains power occurs, the method includes controlling a backup power to be connected to a backup conversion unit. The backup conversion unit is a conversion unit corresponding to the backup power. The central office power system includes the mains power and the backup power. The backup power may be but is not limited to the solar power supply, the diesel generator power supply, or the high-voltage direct current power. It can be understood that, in a scenario in which the various central office power systems supply power together, when a power failure of any one or more central office power systems occurs, the backup power can be controlled to be connected to the backup conversion unit, to keep an input voltage and an output voltage stable.

According to a second aspect, a power system is disclosed, including an input module, a power management unit, an output module, and a bus. The bus is separately electrically connected to the input module, the power management unit, and the output module. The input module includes a power detection circuit and a conversion unit. The output module includes a load detection circuit and a conversion unit. The input module and/or the output module include/includes a plurality of types of conversion units. The power management unit is separately connected to the input module and the output module through signal cables. The power detection circuit is configured to obtain voltage information of each input circuit. The power management unit is configured to generate a first control signal based on the voltage information and a bus voltage value. The conversion unit in the input module is configured to convert a voltage of the input circuit into a bus voltage based on the first control signal. The load detection circuit is connected to one or more loads, and is configured to obtain load information. The power management unit is further configured to generate a second control signal based on the load information and the bus voltage value. The conversion unit in the output module is configured to convert the bus voltage into a load voltage based on the second control signal, and output the load voltage. When the input module includes the plurality of types of conversion units, each conversion unit in the input module has one power detection circuit connected to the conversion unit.

In a possible implementation, when the voltage information includes a voltage type and a voltage value, the power management unit is specifically configured to: when the voltage type is a direct current voltage and a direct current voltage value changes in a solar voltage range, generate a first control signal used to control a photovoltaic-direct current conversion unit; when the voltage type is an alternating current voltage and an alternating current voltage value changes in a mains voltage range, generate a first control signal used to control a first alternating current-direct current conversion unit; when the voltage type is an alternating current voltage and an alternating current voltage value changes in a generation voltage range of a diesel generator, generate a first control signal used to control a second alternating current-direct current conversion unit; or when the voltage information is a direct current voltage and a direct current voltage value changes in a high-voltage direct current voltage range, generate a first control signal used to control a first direct current conversion unit, where the first direct current conversion unit is configured to convert a high-voltage direct current voltage into the bus voltage.

In another possible implementation, when the load information includes a load type and a load voltage value, the power management unit is specifically configured to: when the load type is a direct current load and the load voltage value is lower than a high-voltage direct current voltage value, generate a second control signal used to control a second direct current conversion unit, where the second direct current conversion unit is configured to convert the bus voltage into a load voltage corresponding to the load voltage value; when the load type is a high-voltage direct current load, generate a second control signal used to control a third direct current conversion unit, where the third direct current conversion unit is configured to convert the bus voltage into a high-voltage direct current voltage; or when the load type is an alternating current load, generate a second control signal used to control a direct current-alternating current conversion unit.

In another possible implementation, when the load information includes a load type and a load voltage value, the power management unit is further configured to generate a third control signal when the load type is a direct current load and the load voltage value is equal to the bus voltage value; and the output module is further configured to output the bus voltage to a load through a branch circuit based on the third control signal.

In another possible implementation, each input circuit is connected to one central office power system. The central office power system includes a solar power supply, a mains power, and a high-voltage direct current power. The load detection unit is further configured to obtain load power consumption. The power management unit is further configured to: when the load power consumption is less than or equal to a power of the solar power supply, control the photovoltaic-direct current conversion unit to be connected to the solar power supply; when the load power consumption is greater than the power of the solar power supply and the load power consumption is less than or equal to a power of the mains, control the alternating current-direct current conversion unit to be connected to the mains power; when the load power consumption is greater than mains power consumption and the load power consumption is less than or equal to a first power, control the photovoltaic-direct current conversion unit to be connected to the solar power supply, and control the alternating current-direct current conversion unit to be connected to the mains power; or when the load power consumption is greater than the first power and less than a second power, control the photovoltaic-direct current conversion unit to be connected to the solar power supply, control the alternating current-direct current conversion unit to be connected to the mains power, and control the direct current conversion unit to be connected to the high-voltage direct current power. The first power is equal to a sum of the power of the mains and the power of the solar power supply. The second power is equal to a sum of the power of the mains, the power of the solar power supply, and a power of the high-voltage direct current power.

In another possible implementation, the power management unit is further configured to: when the central office power system includes the mains power and a backup battery and a power failure of the mains power occurs, control the backup battery to be connected to the bus.

In another possible implementation, the power management unit is further configured to: when the central office power system includes the mains power and a backup power and a power failure of the mains power occurs, control the backup power to be connected to a backup conversion unit, where the backup conversion unit is a conversion unit corresponding to the backup power.

In another possible implementation, the conversion unit includes an identifier part, and the identifier part is connected to the power management unit. The power management unit is further configured to determine a type of the conversion unit based on the identifier part.

In another possible implementation, the power system further includes a backplane, and the identifier part is inserted into an identifier hole of the backplane.

In another possible implementation, the power system further includes a power subrack, the power subrack includes a plurality of slots with a same size, and the slot is configured to place the conversion unit.

For steps performed by the power system in the second aspect and beneficial effects, refer to the descriptions in the first aspect and the various possible implementations of the first aspect. Details are not described herein again.

According to a third aspect, a computer-readable storage medium is provided, and the computer-readable storage medium stores instructions. When the instructions are run on a computer, the computer is enabled to perform the method according to the first aspect.

According to a fourth aspect, a computer program product including instructions is provided. When the computer program product runs on a computer, the computer is enabled to perform the method according to the first aspect.

According to a fifth aspect, a chip system is provided. The chip system includes a processor, and is configured to support a power system in implementing functions in the foregoing aspects, for example, sending or processing a control signal and/or information used in the foregoing power control method. In a possible design, the chip system further includes a memory, and the memory is configured to store program instructions and data that are necessary for the power control method. The chip system may include a chip, or may include a chip and another discrete device.

DETAILED DESCRIPTION OF ILLUSTRATIVE EMBODIMENTS

Figure 1:
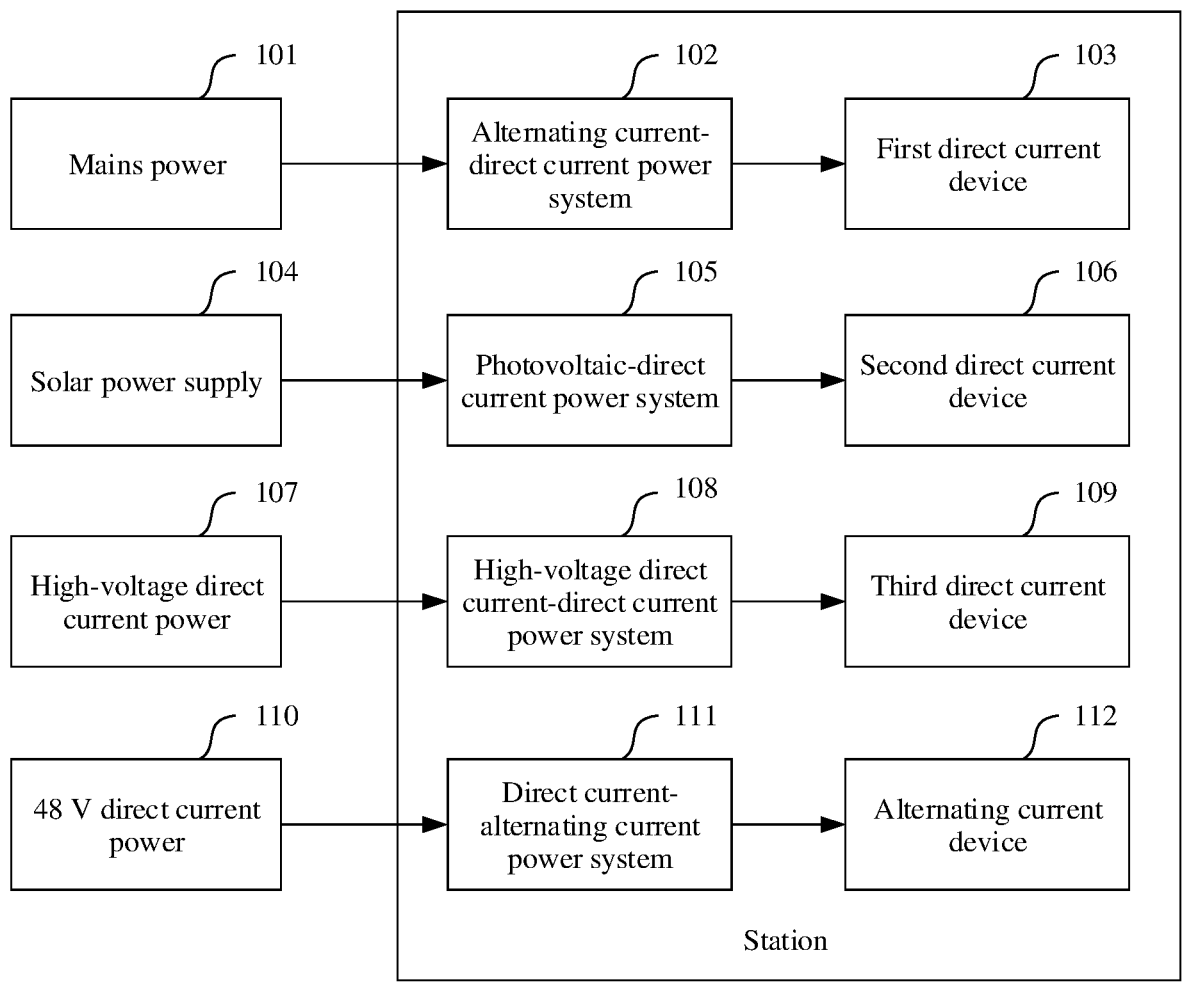
FIG. 1 is a schematic diagram of a power supply scenario at an existing station.
Figure 2:
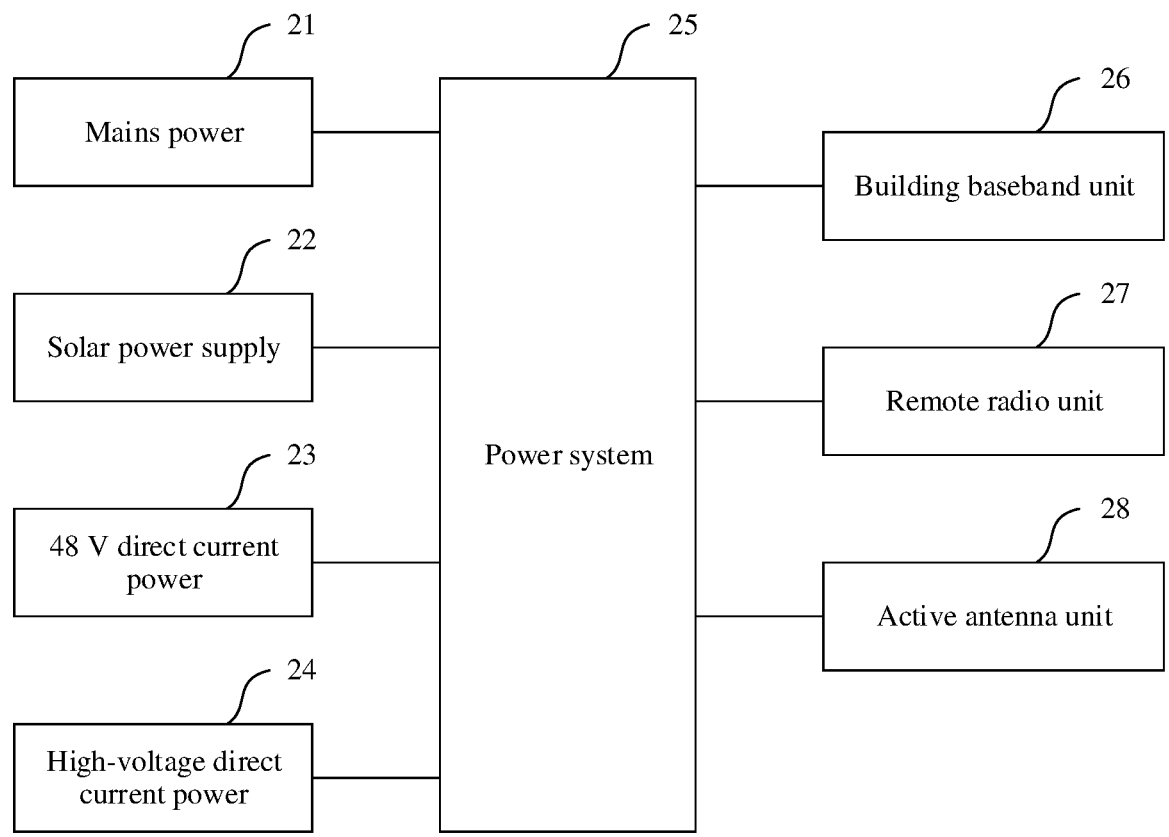
FIG. 2 is a schematic diagram of a power supply scenario at a station according to this application.

A power control method in this application may be applied to a wireless communication station. In a power supply scenario at a station shown in FIG. 2, a central office power system includes a mains power 21, a solar power supply 22, a 48 V direct current power 23, and a high-voltage direct current power 24. Loads include a building BBU 26, an RRU 27, and an active antenna unit (AAU) 28. The mains power 21, the solar power supply 22, the 48 V direct current power 23, and the high-voltage direct current power 24 are separately connected to a power system 25. The power system 25 is separately connected to the BBU 26, the RRU 27, and the AAU 28.

The mains power 21 is configured to provide a city power supply voltage. According to power supply standards of different cities, the city power supply voltage may be a 220 V alternating current voltage, a 110 V alternating current voltage, or the like, where V is volt. The solar power supply 22 is configured to provide a 0-100 V direct current. The 48 V direct current power 23 is configured to provide a 48 V direct current. The high-voltage direct current power 24 is configured to provide an 80 V-400 V direct current.

Types of the central office power systems and a quantity of the central office power systems are not limited to the foregoing example. For example, the central office power system may further include a backup battery, and the backup battery may be a lead-acid rechargeable battery or a lithium battery. The central office power system may further include a diesel generator power supply, and the diesel generator power supply can provide an alternating current. Types of the loads and a quantity of the loads are not limited to the foregoing example.

The power system 25 converts input voltages of the mains power 21, the solar power supply 22, the 48 V direct current power 23, and the high-voltage direct current power 24 into a bus voltage, and then converts the bus voltage into load voltages and outputs the load voltages to the BBU 26, the RRU 27, and the AAU 28.

For ease of understanding, the following describes the power system in detail.

Figure 3:
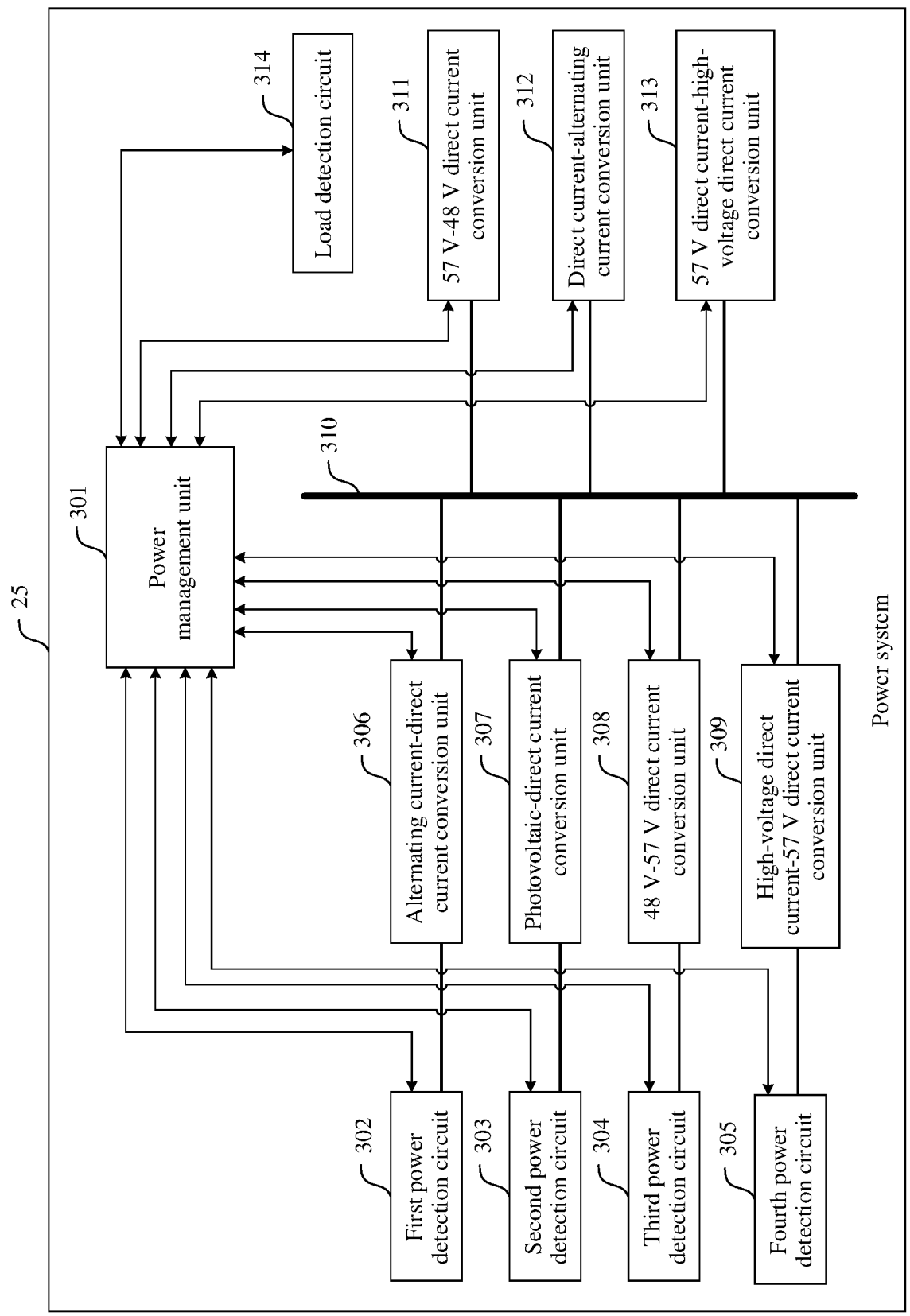
FIG. 3 is a schematic diagram of a structure of a power system according to this application.

With reference to FIG. 3, a power system 25 includes a power management unit (PMU) 301, a first power detection circuit 302, a second power detection circuit 303, a third power detection circuit 304, a fourth power detection circuit 305, an alternating current-direct current conversion unit 306, a photovoltaic-direct current conversion unit 307, a 48 V direct current-57 V direct current conversion unit 308, a high-voltage direct current (HVDC)-57 V direct current conversion unit 309, a bus 310, a 57 V-48 V direct current conversion unit 311, a direct current-alternating current conversion unit 312, a 57 V direct current-HVDC conversion unit 313, and a load detection circuit 314.

In the power system 25, the PMU 301 is separately connected to the first power detection circuit 302, the second power detection circuit 303, the third power detection circuit 304, the fourth power detection circuit 305, the alternating current-direct current conversion unit 306, the photovoltaic-direct current conversion unit 307, the 48 V direct current-57 V direct current conversion unit 308, the high-voltage direct current-57V direct current conversion unit 309, the bus 310, the 57 V direct current-48 V direct current conversion unit 311, the direct current-alternating current conversion unit 312, the 57 V direct current-high-voltage direct current conversion unit 313, and the load detection circuit 314 through signal cables.

Specifically, the first power detection circuit 302 may be connected to the mains power 21, the second power detection circuit 303 may be connected to the solar power supply 22, the third power detection circuit 304 may be connected to the 48 V direct current power 23, and the fourth power detection circuit 305 may be connected to the high-voltage direct current power 24. All the foregoing connection circuits are input circuits of the power system 25. The load detection circuit 314 may be connected to the BBU 26, the RRU 27, and the AAU 28.

In actual application, some devices such as an AC-DC bidirectional converter and an HVDC-DC bidirectional converter can perform bidirectional conversion. The AC-DC bidirectional converter is an alternating current-direct current bidirectional converter, which can convert an alternating current voltage into a direct current voltage and can also convert a direct current voltage into an alternating current voltage. Therefore, the alternating current-direct current conversion unit 306 and the direct current-alternating current conversion unit 312 can implement functions thereof by using the AC-DC bidirectional converter. The high-voltage direct current-57 V direct current conversion unit 309 and the 57 V direct current-high-voltage direct current conversion unit 313 can implement functions thereof by using the HVDC-DC bidirectional converter.

The PMU 301 may include a processor and a memory.

The processor may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example rather than limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The memory is configured to store data and program instructions. The data may be an input voltage value, an input voltage type, an input current value, an input power, a load voltage type, a load voltage value, or the like. By invoking the program instructions stored in the memory, the processor can perform the steps performed by the power management unit in the following embodiments.

The power system 25 shown in FIG. 3 includes a plurality of conversion units configured to convert an input voltage into a bus voltage, and a plurality of conversion units configured to convert a bus voltage into a load voltage. That is, the power system 25 is a multiple-input multiple-output power system. It should be noted that, the power system in this application may be alternatively a multiple-input single-output power system or a single-input multiple-output power system. The multiple-input single-output power system includes a plurality of conversion units configured to convert an input voltage into a bus voltage, and one conversion unit configured to convert a bus voltage into a load voltage. The single-input multiple-output power system includes one conversion unit configured to convert an input voltage into a bus voltage, and a plurality of conversion units configured to convert a bus voltage into a load voltage.

For the power system in this application, this application provides a power control method applied to the power system. The following describes the power control method in detail.

Figure 4:
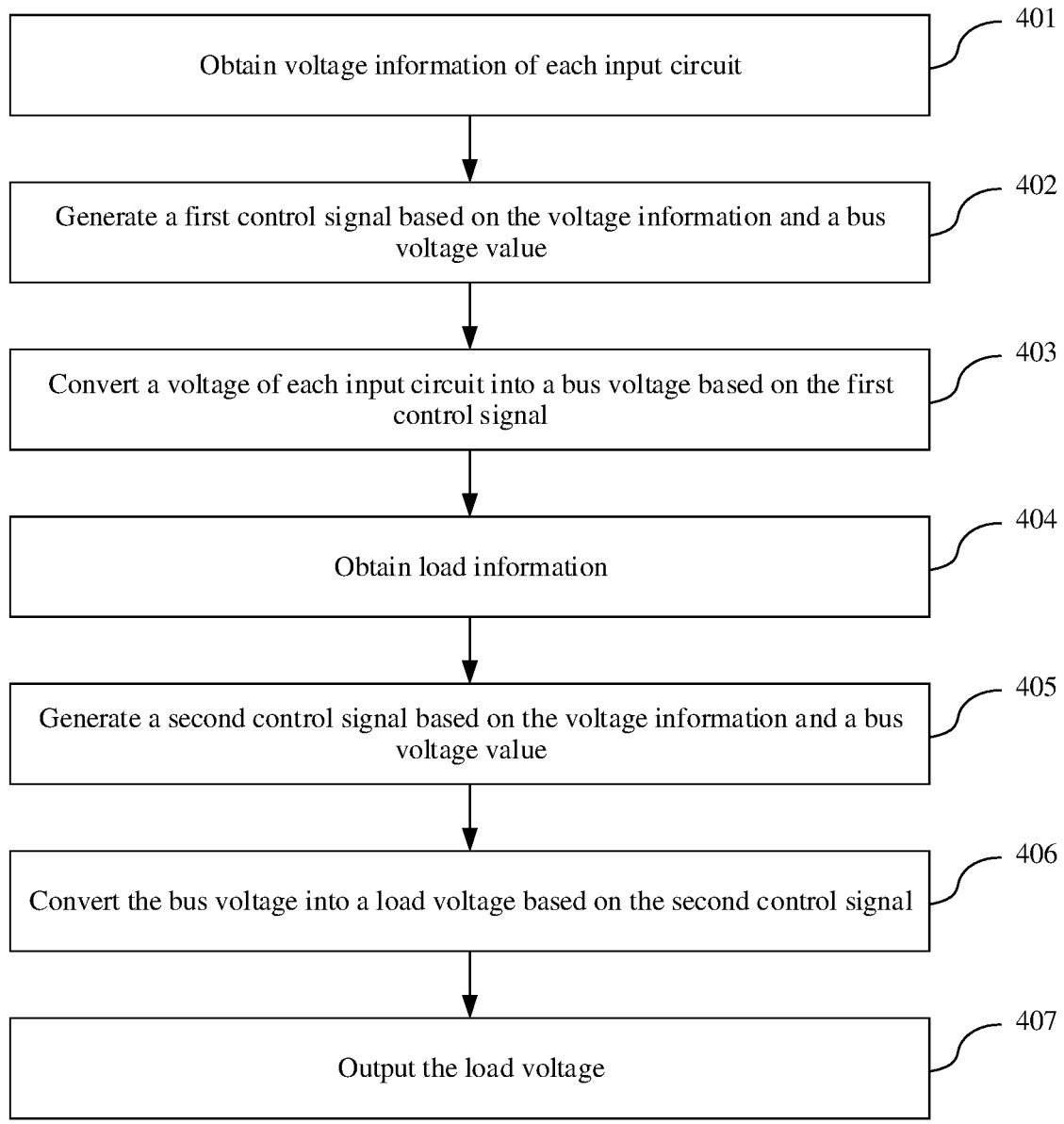
FIG. 4 is a schematic flowchart of a power control method according to this application.

Refer to FIG. 4. An embodiment of a power control method in this application includes the following.

Step 401: Obtain voltage information of each input circuit. The voltage information may include a voltage type and a voltage value.

Step 402: Generate a first control signal based on the voltage information and a bus voltage value. The first control signal is used to control a conversion unit to perform voltage conversion.

Step 403: Convert a voltage of each input circuit into a bus voltage based on the first control signal.

Step 404: Obtain load information.

The load information may include a load voltage type, a load voltage value, load power consumption, and the like.

It should be noted that, there may be no fixed sequence between step 404 and step 401. Step 404 may be performed before step 401 or may be performed between step 401 and step 403, or step 404 and step 401 are simultaneously performed.

Step 405: Generate a second control signal based on the load information and the bus voltage value. The second control signal is used to control a conversion unit in an output module to perform voltage conversion.

Step 406: Convert the bus voltage into a load voltage based on the second control signal.

Step 407: Output the load voltage.

In this embodiment, for each connection circuit between a central office power system and the conversion unit and each connection circuit between a load and the conversion unit, a connectivity status and voltage information of each connection circuit may be monitored. In this way, one or more input voltages can be managed and converted, and one or more output voltages can be provided for one or more loads. Based on the power control method, input and output have a loose coupling relationship. In this way, power supply flexibility can be improved, and power management efficiency can be improved.

In an optional embodiment, when the voltage information includes the voltage type and the voltage value, the generating a first control signal based on the voltage information and a bus voltage value includes: when the voltage type is a direct current voltage and a direct current voltage value changes in a solar voltage range, generating a first control signal used to control a photovoltaic-direct current conversion unit.

Specifically, when the voltage type is the direct current voltage and the direct current voltage value changes in the solar voltage range, it indicates that the input circuit is connected to a solar power supply. In this case, the photovoltaic-direct current conversion unit can be selected from an input module, and the first control signal used to control a photovoltaic-direct current conversion unit is generated. The photovoltaic-direct current conversion unit can convert, based on the first control signal, a voltage input by the solar power supply into the bus voltage.

In another optional embodiment, when the voltage information includes the voltage type and the voltage value, the generating a first control signal based on the voltage information and a bus voltage value includes: when the voltage type is an alternating current voltage and an alternating current voltage value changes in a mains voltage range, generating a first control signal used to control a first alternating current-direct current conversion unit. The mains voltage range may be but is not limited to 90 V-290 V.

Specifically, when the voltage type is the alternating current voltage and the alternating current voltage value changes in the mains voltage range, it indicates that the input circuit is connected to a mains power. In this case, the first alternating current-direct current conversion unit can be selected from the input module, and the first control signal used to control a first alternating current-direct current conversion unit is generated. The first alternating current-direct current conversion unit can convert a mains voltage into the bus voltage based on the first control signal.

In another optional embodiment, when the voltage information includes the voltage type and the voltage value, the generating a first control signal based on the voltage information and a bus voltage value includes: when the voltage type is an alternating current voltage and an alternating current voltage value changes in a generation voltage range of a diesel generator, generating a first control signal used to control a second alternating current-direct current conversion unit. The generation voltage range of the diesel generator may be but is not limited to 176 V-240 V.

Specifically, when the voltage type is the alternating current voltage and the alternating current voltage value changes in the generation voltage range of the diesel generator, it indicates that the input circuit is connected to a diesel generator power supply. In this case, the second alternating current-direct current conversion unit can be selected from the input module, and the first control signal used to control a second alternating current-direct current conversion unit is generated. The second alternating current-direct current conversion unit can convert, based on the first control signal, a voltage output by the diesel generator power supply into the bus voltage.

In another optional embodiment, when the voltage information includes the voltage type and the voltage value, the generating a first control signal based on the voltage information and a bus voltage value includes: when the voltage information is a direct current voltage and a direct current voltage value changes in a high-voltage direct current voltage range, generating a first control signal used to control a first direct current conversion unit, where the first direct current conversion unit is configured to convert a high-voltage direct current voltage into the bus voltage.

Specifically, when the voltage information is the direct current voltage and the direct current voltage value changes in the high-voltage direct current voltage range, it indicates that the input circuit is connected to a high-voltage direct current power. In this case, the first direct current conversion unit can be selected from the input module, and the first control signal used to control a first direct current conversion unit is generated. The first direct current conversion unit can convert, based on the first control signal, a voltage input by the high-voltage direct current power into the bus voltage.

According to the foregoing method implementation, based on the voltage type and voltage fluctuation, a type of the central office power system can be automatically identified. Then, a corresponding conversion unit is selected from the input module for voltage conversion. In this way, the central office power system can be automatically matched with the conversion unit without requiring manual matching, providing advantages of convenience and efficiency.

In another optional embodiment, when the load information includes the load type and the load voltage value, the generating a second control signal based on the load information and the bus voltage value includes: when the load type is a direct current load and the load voltage value is lower than a high-voltage direct current voltage value, generating a second control signal used to control a second direct current conversion unit. The second direct current conversion unit is configured to convert the bus voltage into a load voltage corresponding to the load voltage value. The load voltage value may be higher than the bus voltage value, or may be lower than the bus voltage value. A specific value may be but is not limited to 12 V, 24 V, 48 V, or 72 V.

Specifically, when the load type is the direct current load and the load voltage value is lower than the high-voltage direct current voltage value, the second control signal used to control a second direct current conversion unit is generated. After the second control signal is output to the second direct current conversion unit, the second direct current conversion unit can convert the bus voltage into the load voltage based on the second control signal.

In another optional embodiment, when the load information includes the load type and the load voltage value, the generating a second control signal based on the load information and the bus voltage value includes: when the load type is a high-voltage direct current load, generating a second control signal used to control a third direct current conversion unit. The third direct current conversion unit is configured to convert the bus voltage into a high-voltage direct current voltage. It should be noted that, when the load voltage is higher than the high-voltage direct current voltage, a conversion unit corresponding to the load voltage may also be configured in this application, and the bus voltage can be converted into the foregoing load voltage by using a corresponding second control signal.

In another optional embodiment, when the load information includes the load type and the load voltage value, the generating a second control signal based on the load information and the bus voltage value includes: when the load type is an alternating current load, generating a second control signal used to control a direct current-alternating current conversion unit. The direct current-alternating current conversion unit can convert the bus voltage into an alternating current voltage. A load voltage of the alternating current load may be but is not limited to 220 V or 100 V.

In this way, the load type can be automatically identified, and then a corresponding conversion unit is selected based on the load type to convert a bus voltage into a corresponding load voltage.

In another possible implementation, the power control method further includes: generating a third control signal when the load type is a direct current load and the load voltage value is equal to the bus voltage value; and outputting the bus voltage to a load through a branch circuit based on the third control signal.

When the load type is the direct current load and the load voltage value is equal to the bus voltage value, it indicates that the bus voltage can be directly used as the load voltage. In this way, the bus voltage can be output to the load through the branch circuit of the output module.

In a possible implementation, each input circuit is connected to one central office power system. The central office power system includes the solar power supply, the mains power, and the high-voltage direct current power.

The power control method further includes: obtaining load power consumption; and when the load power consumption is less than or equal to a power of the solar power supply, controlling the photovoltaic-direct current conversion unit to be connected to the solar power supply; when the load power consumption is greater than the power of the solar power supply and the load power consumption is less than or equal to a power of the mains, controlling the alternating current-direct current conversion unit to be connected to the mains power; when the load power consumption is greater than the power of the mains and the load power consumption is less than or equal to a first power, controlling the photovoltaic-direct current conversion unit to be connected to the solar power supply, and controlling the alternating current-direct current conversion unit to be connected to the mains power, where the first power is equal to a sum of the power of the mains and the power of the solar power supply; or when the load power consumption is greater than the first power and less than a second power, controlling the photovoltaic-direct current conversion unit to be connected to the solar power supply, controlling the alternating current-direct current conversion unit to be connected to the mains power, and controlling the direct current conversion unit to be connected to the high-voltage direct current power, where the second power is equal to a sum of the power of the mains, the power of the solar power supply, and a power of the high-voltage direct current power.

When the photovoltaic-direct current conversion unit is connected to the solar power supply, a battery management unit adjusts a voltage output by the photovoltaic-direct current conversion unit to be higher than the bus voltage, to implement solar power supplying. For example, the voltage output by the photovoltaic-direct current conversion unit is 49 V, and the bus voltage is 48 V. A voltage value of the voltage output by the photovoltaic-direct current conversion unit may be set based on an actual situation. A manner in which the battery management unit controls power supply of another power is similar to that of controlling solar power supplying. Details are not described herein.

In this way, the central office power system can be flexibly selected based on a range of the load power consumption, and various central office power systems can supply power together. During the hybrid power supply, an output power can be adjusted in real time, to ensure normal operation of the load. According to the foregoing hybrid power supply method, energy supply from the solar power supply can be more fully utilized, and energy supply from the mains power can be reduced.

In another optional embodiment, the central office power system includes the mains power and a backup battery. The power control method further includes: when a power failure of the mains power occurs, controlling the backup battery to be connected to a bus.

In this embodiment, in a normal power supply state, the mains power is connected to the alternating current-direct current conversion unit, and the backup battery is disconnected from the bus. When the power failure of the mains power occurs, the backup battery is controlled to be connected to the bus. In this way, an input voltage and an output voltage can be kept stable, to avoid a problem that when a power failure of a power occurs, a load powered by the power cannot operate normally.

In another optional embodiment, the central office power system includes the mains power and a backup power. The power control method further includes: when a power failure of the mains power occurs, controlling the backup power to be connected to a backup conversion unit, where the backup conversion unit is a conversion unit corresponding to the backup power.

In this embodiment, in a normal power supply state, the mains power is connected to the alternating current-direct current conversion unit, and the backup power is disconnected from the backup conversion unit. The backup power may be the solar power supply, the diesel generator power supply, or the high-voltage direct current power. When the power failure of the mains power occurs, the backup power is controlled to be connected to the backup conversion unit. In this way, an input voltage and an output voltage can be kept stable, so that the load can operate normally.

Figure 5:
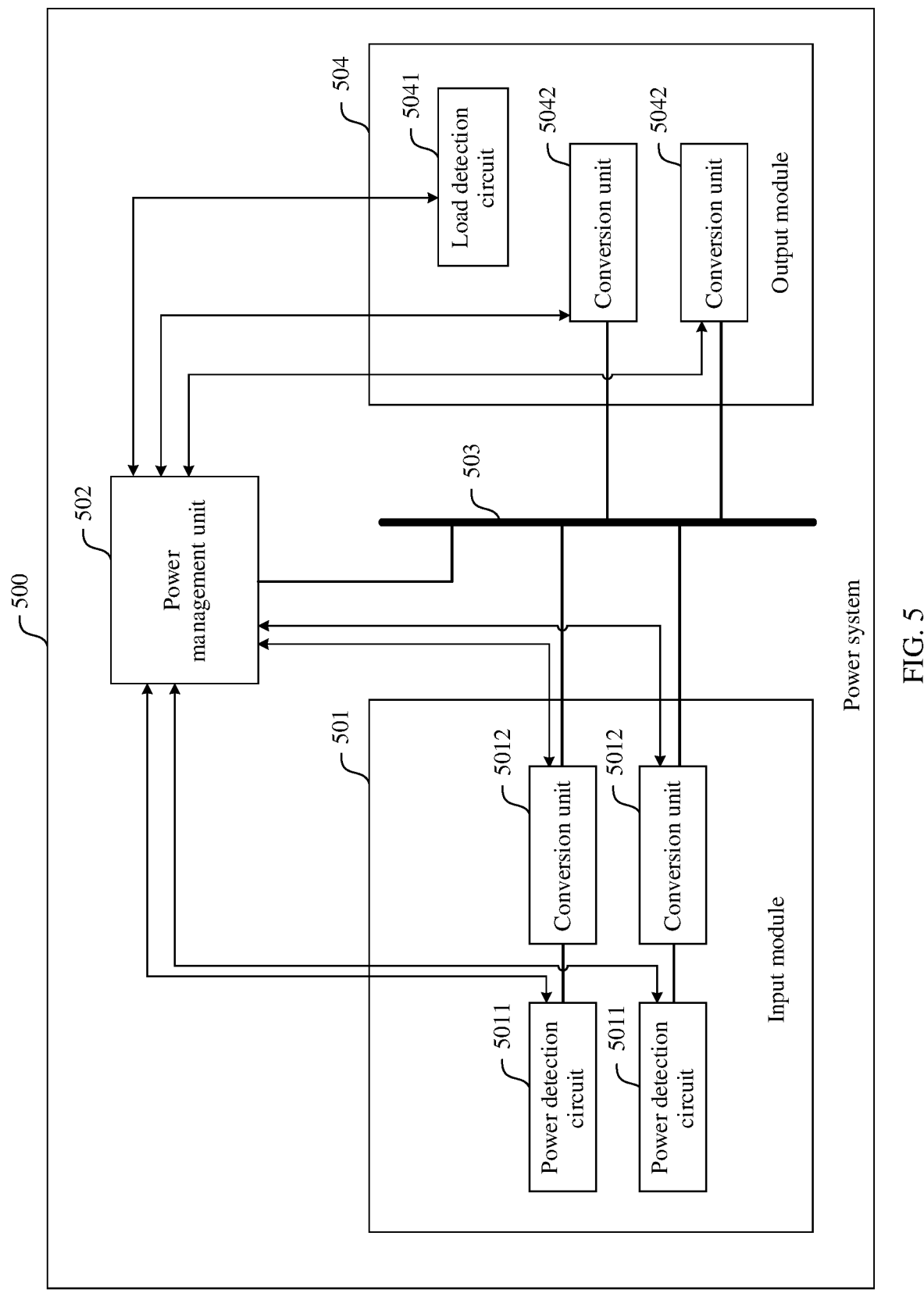
FIG. 5 is a schematic diagram of another structure of a power system according to this application.

The foregoing describes the power control method, and the following describes a power system that can implement the power control method shown in FIG. 4. Refer to FIG. 5. A power system 500 includes: an input module 501, a power management unit 502, a bus 503, and an output module 504. The bus 503 is separately electrically connected to the input module 501, the power management unit 502, and the output module 504. The input module 501 includes a power detection circuit 5011 and a conversion unit 5012. The output module 504 includes a load detection circuit 5041 and a conversion unit 5042. The input module 501 and/or the output module 504 include/includes a plurality of types of conversion units. The power management unit 502 is separately connected to the input module 501 and the output module 504 through signal cables.

The power detection circuit 5011 is configured to obtain voltage information of an input circuit.

The power management unit 502 is configured to generate a first control signal based on the voltage information and a bus voltage value.

The conversion unit 5012 is configured to convert a voltage of the input circuit into a bus voltage based on the first control signal.

The load detection circuit 5041 is configured to obtain load information.

The power management unit 502 is further configured to generate a second control signal based on the load information and the bus voltage value.

The conversion unit 5042 is configured to convert the bus voltage into a load voltage based on the second control signal, and output the load voltage.

In this embodiment, the power detection circuit 5011 is electrically connected to the conversion unit 5012. Specifically, the bus 503 is separately electrically connected to the conversion unit 5012 and the conversion unit 5042 through branch circuits. Specifically, the power management unit 502 is separately connected to the power detection circuit 5011, the conversion unit 5012, the load detection circuit 5041, and the conversion unit 5042 through signal cables. In FIG. 5, the signal cable is represented by using a line with a double-headed arrow. The load detection circuit 5041 may be connected to one or more loads. The load information may include but is not limited to one or more pieces of the following information: a load voltage, a load current, and a load power, where the load power is also referred to as load power consumption.

The power management unit 502 can collect information about all circuits, such as voltages, currents, and connectivity statuses, calculate a power, efficiency, and the like, and can further implement functions such as control and alarm for each unit and/or circuit.

In an optional embodiment, the voltage information includes a voltage type and a voltage value.

The power management unit 502 is specifically configured to: when the voltage type is a direct current voltage and a direct current voltage value changes in a solar voltage range, generate a first control signal used to control a photovoltaic-direct current conversion unit; when the voltage type is an alternating current voltage and an alternating current voltage value changes in a mains voltage range, generate a first control signal used to control a first alternating current-direct current conversion unit; when the voltage type is an alternating current voltage and an alternating current voltage value changes in a generation voltage range of a diesel generator, generate a first control signal used to control a second alternating current-direct current conversion unit; or when the voltage information is a direct current voltage and a direct current voltage value changes in a high-voltage direct current voltage range, generate a first control signal used to control a first direct current conversion unit, where the first direct current conversion unit is configured to convert a high-voltage direct current voltage into the bus voltage.

In another optional embodiment, the load information includes a load type and a load voltage value.

The power management unit 502 is specifically configured to: when the load type is a direct current load and the load voltage value is lower than a high-voltage direct current voltage value, generate a second control signal used to control a second direct current conversion unit, where the second direct current conversion unit is configured to convert the bus voltage into a load voltage corresponding to the load voltage value; when the load type is a high-voltage direct current load, generate a second control signal used to control a third direct current conversion unit, where the third direct current conversion unit is configured to convert the bus voltage into a high-voltage direct current voltage; or when the load type is an alternating current load, generate a second control signal used to control a direct current-alternating current conversion unit.

In another optional embodiment, the load information includes a load type and a load voltage value.

The power management unit 502 is further configured to generate a third control signal when the load type is a direct current load and the load voltage value is equal to the bus voltage value.

The output module 504 is further configured to output the bus voltage to a load through a branch circuit based on the third control signal.

In another optional embodiment, a central office power system includes a solar power supply, a mains power, and a high-voltage direct current power.

The load detection unit 5041 is further configured to obtain the load power consumption.

The power management unit 502 is further configured to: when the load power consumption is less than or equal to a power of the solar power supply, control the photovoltaic-direct current conversion unit to be connected to the solar power supply; when the load power consumption is greater than the power of the solar power supply and the load power consumption is less than or equal to a power of the mains, control the alternating current-direct current conversion unit to be connected to the mains power; when the load power consumption is greater than mains power consumption and the load power consumption is less than or equal to a first power, control the photovoltaic-direct current conversion unit to be connected to the solar power supply, and control the alternating current-direct current conversion unit to be connected to the mains power; or when the load power consumption is greater than the first power and less than a second power, control the photovoltaic-direct current conversion unit to be connected to the solar power supply, control the alternating current-direct current conversion unit to be connected to the mains power, and control the direct current conversion unit to be connected to the high-voltage direct current power.

The first power is equal to a sum of the power of the mains and the power of the solar power supply. The second power is equal to a sum of the power of the mains, the power of the solar power supply, and a power of the high-voltage direct current power.

In another optional embodiment, the power management unit 502 is further configured to: when the central office power system includes the mains power and a backup battery and a power failure of the mains power occurs, control the backup battery to be connected to the bus.

In another optional embodiment, the power management unit 502 is further configured to: when the central office power system includes the mains power and a backup power and a power failure of the mains power occurs, control the backup power to be connected to a backup conversion unit, where the backup conversion unit is a conversion unit corresponding to the backup power.

In another optional embodiment, each of the conversion unit 5012 and the conversion unit 5042 includes an identifier part, and the identifier part is connected to the power management unit 502.

The power management unit 502 is further configured to determine a type of the conversion unit based on the identifier part.

In this embodiment, the identifier part may be implemented by using a hardware pin, or may be implemented by using a dual in-line package switch or a software identifier. For example, 001 identifies an AC-DC conversion unit, 002 identifies an HVDC-DC conversion unit, and 003 identifies a PV-DC conversion unit, where the AC-DC conversion unit means the alternating current-direct current conversion unit, and the PV-DC conversion unit means the photovoltaic-direct current conversion unit. The foregoing correspondence between an identification number and the conversion unit is an example. Alternatively, the conversion unit may be indicated by using another identification number. This is not limited in this application.

In another optional embodiment, the power system further includes a power subrack, the power subrack includes a plurality of slots with a same size, and the slots are configured to place the conversion unit 5012 or the conversion unit 5042. For a 3-input 3-output power, configuration costs of the power system in this application are approximately 0.57 times the costs of three independent power supplies. Therefore, configuration costs can be reduced.

It can be understood that, corresponding slots can also be provided for conversion units of different sizes. This is not limited in this application.

In another optional embodiment, the power subrack includes a backplane, and the identifier part is inserted into an identifier hole of the backplane.

Figure 6:
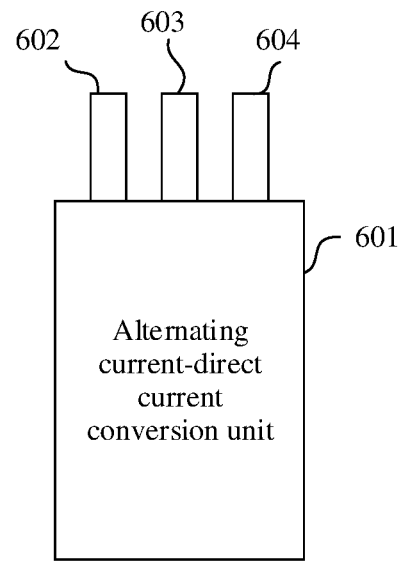
FIG. 6 is a schematic diagram of an identifier part of an alternating current-direct current conversion unit according to this application.

Refer to FIG. 6. An alternating current-direct current conversion unit 601 is provided with an identifier part terminal 602, an alternating current terminal 603, and a direct current terminal 604. The alternating current terminal 603 is configured to connect to an alternating current power, and the direct current terminal 604 is configured to connect to the bus. The alternating current-direct current conversion unit 601 may be inserted into the hole in the backplane by using the identifier part terminal 602, the alternating current terminal 603, and the direct current terminal 604. The identifier part terminal 602 may include a plurality of pins.

Figure 7:
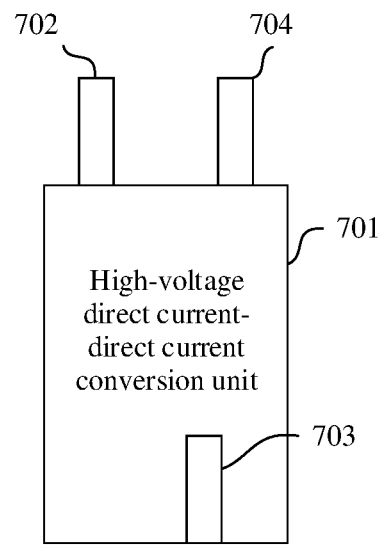
FIG. 7 is a schematic diagram of an identifier part of a high-voltage direct current-direct current conversion unit according to this application.

Refer to FIG. 7. A high-voltage direct current-direct current conversion unit 701 is provided with an identifier part terminal 702, a high-voltage direct current terminal 703, and a direct current terminal 704. The high-voltage direct current terminal 703 is configured to connect to the high-voltage direct current power, and the direct current terminal 704 is configured to connect to the bus. The high-voltage direct current-direct current conversion unit 701 may be inserted into the hole in the backplane by using the identifier part terminal 702 and the direct current terminal 704. The identifier part terminal 702 may include a plurality of pins.

Figure 8:
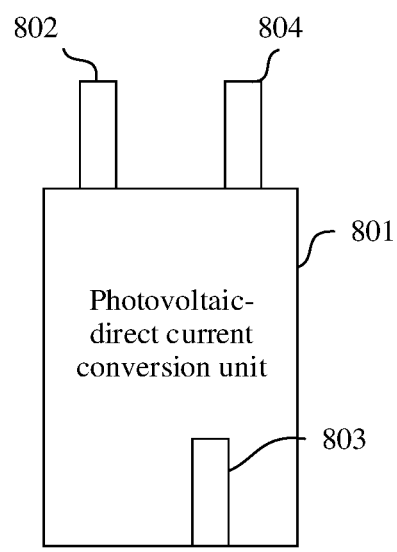
FIG. 8 is a schematic diagram of an identifier part of a photovoltaic-direct current conversion unit according to this application.

Refer to FIG. 8. A photovoltaic-direct current conversion unit 801 is provided with an identifier part terminal 802, a solar terminal 803, and a direct current terminal 804. The solar terminal 803 is configured to connect to the solar power supply, and the direct current terminal 804 is configured to connect to the bus. The photovoltaic-direct current conversion unit 801 may be inserted into the hole in the backplane by using the identifier part terminal 802 and the direct current terminal 804. The identifier part terminal 802 may include a plurality of pins.

In the foregoing conversion unit, the identifier part can operate when the terminal of the conversion unit is inserted into the backplane.

In this application, A-B conversion is used to indicate that a type A voltage is converted into a type B voltage. A and B may be different types of voltages, for example, A is an alternating current voltage, and B is a direct current voltage. Alternatively, A and B may be a same type of voltages with different voltage values, for example, A is a 57 V direct current, and B is a 48 V direct current. A-B conversion is AB conversion.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application, and the details are not described herein again.

In addition, it should be noted that, the apparatus embodiments described above are examples, and units described as separate parts may or may not be physically separate. Some or all of the modules may be selected based on actual needs to achieve the objective of the solution of this application. In addition, in the accompanying drawings of the apparatus embodiments in this application, connection relationships between units indicate that the units have communication connections with each other, which may be specifically implemented as one or more communication buses or signal cables. Some other connection relationships between the units indicate that the units are electrically connected, which may be specifically implemented as one or more circuits.

This application provides a computer storage medium, including instructions. When the instructions are run on a computer, the computer is enabled to perform the steps performed by the power system in the embodiment shown in FIG. 4.

The PMU in this application may be specifically a chip in the PMU, and the chip includes a processing unit and a communication unit. The processing unit may be a processor, and the communication unit may be, for example, an input/output interface, a pin, or a circuit. The processing unit can execute computer instructions stored in a storage unit, so that the power system performs the power control method in the embodiment shown in FIG. 4 or the optional embodiments. Optionally, the storage unit is a storage unit in the chip, for example, a register or a cache. Alternatively, the storage unit may be a storage unit that is in the radio access device and that is outside the chip, for example, a ROM, or a static storage device capable of storing static information and another type, for example, a RAM. The processor mentioned above may be a general-purpose central processing unit, a microprocessor, an ASIC, or one or more integrated circuits configured to control program execution of the method according to the first aspect.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially, or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc in the computer, and includes several instructions for enabling a computer device (which may be a personal computer, a server, or a network device) to perform the method described in embodiments of this application.

All or some of the foregoing embodiments may be implemented by using software, hardware, firmware, or any combination thereof. When software is used to implement the embodiments, all or some of embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. A method applied to a power system, wherein the method comprises:
obtaining voltage information of each second input circuit of one or more second input circuits, wherein the power system comprises a power system input circuit, a power management circuit, an output circuit, and a bus, the bus is separately electrically connected to the power system input circuit, the power management circuit, and the output circuit, the power system input circuit or the output circuit comprises a plurality of types of conversion circuits, the power system input circuit comprises a first power detection circuit and a first conversion circuit, the output circuit comprises a load detection circuit and a second conversion circuit, the power management circuit is separately connected to the power system input circuit and the output circuit through signal cables, and the one or more second input circuits are connected to the power system input circuit;
generating a first control signal based on the voltage information of each second input circuit and a bus voltage value;
converting a voltage of each second input circuit into a bus voltage based on the first control signal;
obtaining load information;
generating a second control signal based on the load information and the bus voltage value;
converting the bus voltage into a load voltage based on the second control signal; and
outputting the load voltage.

2. The method according to claim 1, wherein the voltage information of each second input circuit comprises a respective voltage type and a respective voltage value; and
wherein generating the first control signal based on the voltage information of each second input circuit and the bus voltage value comprises:
when a voltage type of the voltage information of a respective second input circuit is a direct current voltage and a direct current voltage value changes in a solar voltage range, generating a first control signal used to control a photovoltaic-direct current conversion circuit;
when a voltage type of the voltage information of a respective second input circuit is an alternating current voltage and an alternating current voltage value changes in a mains voltage range, generating a first control signal used to control a first alternating current-direct current conversion circuit;
when a voltage type of the voltage information of a respective second input circuit is an alternating current voltage and an alternating current voltage value changes in a generation voltage range of a diesel generator, generating a first control signal used to control a second alternating current-direct current conversion circuit; or
when a voltage type of the voltage information of a respective second input circuit is a direct current voltage and a direct current voltage value changes in a high-voltage direct current voltage range, generating a first control signal used to control a first direct current conversion circuit, wherein the first direct current conversion circuit is configured to convert a high-voltage direct current voltage into the bus voltage.

3. The method according to claim 1, wherein the load information comprises a load type and a load voltage value; and
wherein generating the second control signal based on the load information and the bus voltage value comprises:
when the load type is a direct current load and the load voltage value is lower than a high-voltage direct current voltage value, generating the second control signal to control a second direct current conversion circuit, wherein the second direct current conversion circuit is configured to convert the bus voltage into a load voltage corresponding to the load voltage value;
when the load type is a high-voltage direct current load, generating the second control signal to control a third direct current conversion circuit, wherein the third direct current conversion circuit is configured to convert the bus voltage into a high-voltage direct current voltage; or
when the load type is an alternating current load, generating the second control signal to control a direct current-alternating current conversion circuit.

4. The method according to claim 1, wherein the load information comprises a load type and a load voltage value; and
wherein the method further comprises:
generating a third control signal when the load type is a direct current load and the load voltage value is equal to the bus voltage value; and
outputting the bus voltage to a load through a branch circuit based on the third control signal.

5. The method according to claim 1, further comprising:
obtaining a load power consumption; and
performing the following:
when the load power consumption is less than or equal to a power of a solar power supply, controlling a photovoltaic-direct current conversion circuit to be connected to the solar power supply;
when the load power consumption is greater than the power of the solar power supply and the load power consumption is less than or equal to a power of a mains, controlling an alternating current-direct current conversion circuit to be connected to a mains power;
when the load power consumption is greater than the power of the mains and the load power consumption is less than or equal to a first power, controlling a photovoltaic-direct current conversion circuit to be connected to the solar power supply and controlling the alternating current-direct current conversion circuit to be connected to the mains power, wherein the first power is equal to a sum of the power of the mains and the power of the solar power supply; or when the load power consumption is greater than the first power and less than a second power, controlling the photovoltaic-direct current conversion circuit to be connected to the solar power supply, controlling the alternating current-direct current conversion circuit to be connected to the mains power, and controlling a direct current conversion circuit to be connected to a high-voltage direct current power, wherein the second power is equal to a sum of the power of the mains, the power of the solar power supply, and a power of the high-voltage direct current power.

6. The method according to claim 1, wherein:
a central office power system comprises a mains power and a backup battery; and
the method further comprises:
when a power failure of the mains power occurs, controlling the backup battery to be connected to the bus.

7. The method according to claim 1, wherein:
a central office power system comprises a mains power and a backup power; and
the method further comprises:
when a power failure of the mains power occurs, controlling the backup power to be connected to a backup conversion circuit, wherein the backup conversion circuit corresponds to the backup power.

8. A power system, comprising:
a power system input circuit;
a power management circuit;
an output circuit; and
a bus, wherein the bus is separately electrically connected to the power system input circuit, the power management circuit, and the output circuit, the power system input circuit comprises a power detection circuit and a first conversion circuit, the output circuit comprises a load detection circuit and a second conversion circuit, the power system input circuit or the output circuit comprises a plurality of types of conversion circuits, and the power management circuit is separately connected to the power system input circuit and the output circuit through signal cables;
wherein the power detection circuit is configured to obtain voltage information of each second input circuit of one or more second input circuits;
wherein the power management circuit is configured to generate a first control signal based on the voltage information of each second input circuit and a bus voltage value;
wherein the first conversion circuit in the power system input circuit is configured to convert a voltage of the power system input circuit into a bus voltage based on the first control signal;
wherein the load detection circuit is configured to obtain load information;
wherein the power management circuit is further configured to generate a second control signal based on the load information and the bus voltage value; and wherein the second conversion circuit in the output circuit is configured to convert the bus voltage into a load voltage based on the second control signal, and output the load voltage.

9. The power system according to claim 8, wherein the voltage information of each second input circuit comprises a voltage type and a voltage value; and
wherein the power management circuit is configured to:
when a voltage type of the voltage information of a respective second input circuit is a direct current voltage and a direct current voltage value changes in a solar voltage range, generate the first control signal to control a photovoltaic-direct current conversion circuit;
when a voltage type of the voltage information of a respective second input circuit is an alternating current voltage and an alternating current voltage value changes in a mains voltage range, generate the first control signal to control a first alternating current-direct current conversion circuit;
when a voltage type of the voltage information of a respective second input circuit is an alternating current voltage and an alternating current voltage value changes in a generation voltage range of a diesel generator, generate the first control signal to control a second alternating current-direct current conversion circuit; or
when the voltage information is a direct current voltage and a direct current voltage value changes in a high-voltage direct current voltage range, generate the first control signal to control a first direct current conversion circuit, wherein the first direct current conversion circuit is configured to convert a high-voltage direct current voltage into the bus voltage.

10. The power system according to claim 8, wherein the load information comprises a load type and a load voltage value; and
wherein the power management circuit is configured to:
when the load type is a direct current load and the load voltage value is lower than a high-voltage direct current voltage value, generate a second control signal used to control a second direct current conversion circuit, wherein the second direct current conversion circuit is configured to convert the bus voltage into a load voltage corresponding to the load voltage value;
when the load type is a high-voltage direct current load, generate a second control signal used to control a third direct current conversion circuit, wherein the third direct current conversion circuit is configured to convert the bus voltage into a high-voltage direct current voltage; or
when the load type is an alternating current load, generate a second control signal used to control a direct current-alternating current conversion circuit.

11. The power system according to claim 8, wherein the load information comprises a load type and a load voltage value; and
wherein the power management circuit is further configured to generate a third control signal when the load type is a direct current load and the load voltage value is equal to the bus voltage value; and
wherein the output circuit is further configured to output the bus voltage to a load through a branch circuit based on the third control signal.

12. The power system according to claim 8, wherein:
the load detection circuit is further configured to obtain load power consumption; and
the power management circuit is further configured to:

when the load power consumption is less than or equal to a power of a solar power supply, control a photovoltaic-direct current conversion circuit to be connected to the solar power supply;

when the load power consumption is greater than the power of the solar power supply and the load power consumption is less than or equal to a power of a mains, control an alternating current-direct current conversion circuit to be connected to a mains power;

when the load power consumption is greater than mains power consumption and the load power consumption is less than or equal to a first power, control the photovoltaic-direct current conversion circuit to be connected to the solar power supply, and control the alternating current-direct current conversion circuit to be connected to the mains power; or when the load power consumption is greater than the first power and less than a second power, control the photovoltaic-direct current conversion circuit to be connected to the solar power supply, control the alternating current-direct current conversion circuit to be connected to the mains power, and control the direct current conversion circuit to be connected to a high-voltage direct current power, wherein the first power is equal to a sum of the power of the mains and the power of the solar power supply, and the second power is equal to a sum of the power of the mains, the power of the solar power supply, and a power of the high-voltage direct current power.

13. The power system according to claim 8, wherein the power management circuit is further configured to:
when a central office power system comprises a mains power and a backup battery, and a power failure of the mains power occurs, control the backup battery to be connected to the bus.

14. The power system according to claim 8, wherein the power management circuit is further configured to:
when a central office power system comprises a mains power and a backup power, and a power failure of the mains power occurs, control the backup power to be connected to a backup conversion circuit, wherein the backup conversion circuit corresponds to the backup power.

15. The power system according to claim 8, wherein both the first conversion circuit in the power system input circuit and the second conversion circuit in the output circuit comprise an identifier part, and the identifier part is connected to the power management circuit through a signal cable; and
wherein the power management circuit is further configured to determine a type of the first conversion circuit or the second conversion circuit based on the respective identifier part.

16. The power system according to claim 8, further comprising:
a power subrack, wherein the power subrack comprises a plurality of slots with a same size, and each slot is configured to place a conversion circuit in the power system input circuit or a conversion circuit in the output circuit.

17. A non-transitory computer storage medium, comprising instructions, wherein the non-transitory computer storage medium is applied to a power system, and when the instructions are run on a computer, the computer is enabled to perform the following:
obtaining voltage information of each second input circuit of one or more second input circuits, wherein the power system comprises a power system input circuit, a power management circuit, an output circuit, and a bus, the bus is separately electrically connected to the power system input circuit, the power management circuit, and the output circuit, the power system input circuit or the output circuit comprises a plurality of types of conversion circuits, the power system input circuit comprises a first power detection circuit and a first conversion circuit, the output circuit comprises a load detection circuit and a second conversion circuit, the power management circuit is separately connected to the power system input circuit and the output circuit through signal cables, and the one or more second input circuits are connected to the power system input circuit;

generating a first control signal based on the voltage information of each second input circuit and a bus voltage value;

converting a voltage of each second input circuit into a bus voltage based on the first control signal;

obtaining load information;

generating a second control signal based on the load information and the bus voltage value;

converting the bus voltage into a load voltage based on the second control signal; and outputting the load voltage.

18. The non-transitory computer storage medium according to claim 17, wherein the voltage information of each second input circuit comprises a respective voltage type and a respective voltage value; and
wherein generating the first control signal based on the voltage information of each second input circuit and the bus voltage value comprises:
when a voltage type of the voltage information of a respective second input circuit is a direct current voltage and a direct current voltage value changes in a solar voltage range, generating a first control signal used to control a photovoltaic-direct current conversion circuit;
when a voltage type of the voltage information of a respective second input circuit is an alternating current voltage and an alternating current voltage value changes in a mains voltage range, generating a first control signal used to control a first alternating current-direct current conversion circuit;
when a voltage type of the voltage information of a respective second input circuit is an alternating current voltage and an alternating current voltage value changes in a generation voltage range of a diesel generator, generating a first control signal used to control a second alternating current-direct current conversion circuit; or
when a voltage type of the voltage information of a respective second input circuit is a direct current voltage and a direct current voltage value changes in a high-voltage direct current voltage range, generating a first control signal used to control a first direct current conversion circuit, wherein the first direct current conversion circuit is configured to convert a high-voltage direct current voltage into the bus voltage.

19. The non-transitory computer storage medium according to claim 17, wherein the load information comprises a load type and a load voltage value; and
wherein generating the second control signal based on the load information and the bus voltage value comprises:
when the load type is a direct current load and the load voltage value is lower than a high-voltage direct current voltage value, generating the second control signal to control a second direct current conversion circuit, wherein the second direct current conversion circuit is configured to convert the bus voltage into a load voltage corresponding to the load voltage value;

when the load type is a high-voltage direct current load, generating the second control signal to control a third direct current conversion circuit, wherein the third direct current conversion circuit is configured to convert the bus voltage into a high-voltage direct current voltage; or when the load type is an alternating current load, generating the second control signal to control a direct current-alternating current conversion circuit.

20. The non-transitory computer storage medium according to claim 17, wherein the load information comprises a load type and a load voltage value; and wherein when the instructions are run on a computer, the computer is enabled to further perform the following:

generating a third control signal when the load type is a direct current load and the load voltage value is equal to the bus voltage value; and outputting the bus voltage to a load through a branch circuit based on the third control signal.

* * * * *